(12) United States Patent
Heredia et al.

(10) Patent No.: US 8,086,678 B2
(45) Date of Patent: Dec. 27, 2011

(54) DEVICE CENTRIC CONTROLS FOR A DEVICE CONTROLLED THROUGH A WEB PORTAL

(75) Inventors: Rafael Heredia, Easley, SC (US); Frank U. Greer, IV, Greenville, SC (US); Michael Wayne Crowe, Clover, SC (US)

(73) Assignee: Zipit Wireless, Inc., Greenville, SC (US)

(*) Notice: Subject to any disclaimer, the term of this patent is extended or adjusted under 35 U.S.C. 154(b) by 215 days.

(21) Appl. No.: 12/236,441

(22) Filed: Sep. 23, 2008

(65) Prior Publication Data

US 2009/0083385 A1 Mar. 26, 2009

Related U.S. Application Data

(60) Provisional application No. 60/995,107, filed on Sep. 24, 2007.

(51) Int. Cl.
*G06F 15/16* (2006.01)
*G06F 15/173* (2006.01)
*G06F 7/00* (2006.01)

(52) U.S. Cl. .................. 709/206; 709/223; 707/705

(58) Field of Classification Search .......... 709/206, 709/223; 707/705; 455/466
See application file for complete search history.

(56) References Cited

U.S. PATENT DOCUMENTS

| | | | |
|---|---|---|---|
| 6,466,971 B1 * | 10/2002 | Humpleman et al. ........ 709/220 |
| 6,920,492 B2 | 7/2005 | Richard | |
| 7,130,616 B2 | 10/2006 | Janik | |
| 7,200,683 B1 | 4/2007 | Wang et al. | |
| 7,292,870 B2 | 11/2007 | Heredia et al. | |
| 7,475,346 B1 | 1/2009 | Bullock et al. | |
| 7,480,512 B2 | 1/2009 | Graham et al. | |
| 2002/0049806 A1 * | 4/2002 | Gatz et al. ................. 709/203 |
| 2003/0101343 A1 * | 5/2003 | Eaton et al. ................ 713/170 |
| 2004/0003071 A1 * | 1/2004 | Mathew et al. ............. 709/223 |
| 2005/0060167 A1 * | 3/2005 | Patron et al. ................... 705/1 |
| 2005/0144237 A1 | 6/2005 | Heredia et al. | |
| 2005/0198234 A1 * | 9/2005 | Leib et al. .................. 709/221 |
| 2006/0293057 A1 * | 12/2006 | Mazerski et al. ............ 455/445 |
| 2007/0013515 A1 | 1/2007 | Johnson et al. | |

* cited by examiner

*Primary Examiner* — Ranodhi N Serrao
(74) *Attorney, Agent, or Firm* — Maginot, Moore & Beck, LLP

(57) ABSTRACT

A system controls computer network communication devices in a background session in accordance with a control database. The system includes a computer network communication device having a non-volatile memory containing a unique device identifier and a communication module for communicating with a control site, the communication module being configured to generate monitor messages containing the unique device identifier and data corresponding to entry of a command by a user and to parse command messages received from the control site, and a control site comprising a device database and a control database, the control site being configured to compare data in the monitor message to control data stored in the control database in response to the monitor message having a unique device identifier that is also stored in the device database.

8 Claims, 7 Drawing Sheets

DEVICE CENTRIC CONTROLS FOR A DEVICE CONTROLLED THROUGH A WEB PORTAL

TECHNICAL FIELD

This invention relates to controls for network communication devices and, more particularly, to parental controls for mobile instant messaging terminals.

BACKGROUND

Instant messaging is used to describe a computer network service for the communication of textual messages between users in a real-time manner. Three major providers of instant messaging services are America On-Line Instant Messaging (AIM), Microsoft Network (MSN) Messenger, and Yahoo Instant Messenger. These providers enable subscribers to access an instant messaging service through a subscriber's Internet service provider (ISP). To access the instant messaging service, a subscriber uses a computer terminal executing an application program to couple to an ISP and then access an instant messaging service. Once the instant messaging service is accessed, the user may query the service for identification of the "buddies" that are currently accessing the instant messaging service provider. "Buddies" are other subscribers to the instant messaging service that a subscriber has identified as a possible recipient for instant messages. The buddies are identified by including their instant messaging service usernames in a subscriber's buddy list. A subscriber may then initiate an instant messaging session with a buddy by typing and addressing a textual/graphical message to one of the buddies on the messaging service. When the subscriber activates the sending function for the message, the messaging service communicates the message to a buddy and activates a notification feature, such as an audio file, to inform the buddy that a message has been received through the instant messaging service. The buddy may then view the message, type a response, and send it through the messaging service. The conversation may continue in this manner until one of the parties terminates the session.

Communication terminals for receiving textual and graphic messages are well-known. These terminals include cellular telephones, two-way pagers, personal digital assistants (PDAs), and handheld computers, which are commonly known as palmtop computers. One such terminal that integrates the functions required for instant messaging with wireless communication capabilities in a handheld terminal is disclosed in U.S. Pat. No. 7,292,870, which is entitled "Instant Messaging Terminal Which Is Adapted For WI-Fl Access Points." The disclosure of that patent is hereby expressly incorporated by reference in its entirety in this document.

Instant messaging terminals are frequently used to communicate with an instant messaging service provider through wireless access points. A wireless access point includes a radio transceiver and server that typically implement the 802.11b, 802.11a, 802.11g, 802.11n, or some other known wireless communication standard that supports internet or other wide area network communications. Locations providing wireless access points for the Internet are commonly referred to as "hotspots." These hotspots are local area networks (LANs) and devices on such a LAN may be coupled to the Internet. The provision of wireless Internet access can be an important draw for an establishment, such as a coffee shop or the like. However, the access point must be implemented with care to reduce the risk that unscrupulous computer users will attempt Internet access through the access point for the purposes of web site hacking with an enhanced degree of anonymity. Design aspects considered in the implementation of a hotspot include the radius in which the transceiver effectively communicates and the security scheme that allows a customer to use an access point. Typically, the transmission power of the transceiver is limited to a level so the radiation pattern does not extend past the boundaries of the commercial premises to reduce the risk of unobserved access to the local network through the access point. Additionally, a security method, such as Wired Equivalent Privacy (WEP) or Wi-Fi Protected Access (WPA), is implemented by the access point components to determine whether Internet access is granted through the access point.

To avoid lengthy cables in a home or small office environment, many of these locations use wireless routers to communicate wirelessly with computers located in the home or office. The wireless router enables the computers wirelessly coupled to it to access the Internet. By using a Wi-Fi router, computers in the home or office are coupled together in a LAN without requiring cables to be coupled between the computers and the router for communication purposes.

Data communications such as instant messaging (IM) and SMS texting have increased in popularity partially because hotspots, wireless routers, and other wireless mediums have made portable communications ubiquitous. The ease of instant messaging and SMS texting service access, however, has provided younger users with a mode of communication that is less perceptible to parents than the auditory communication that occurs with telephones. As instant messaging has become increasingly popular with younger users, the features of instant messaging terminals have evolved to provide the users with other features, such as Internet radio stations, voice over IP (VoIP) telephone service, and podcasts. Parents are legitimately concerned regarding the distractions these terminals present to their children as well as the access to their children that instant messaging may provide others.

SUMMARY

A system controls computer network communication devices in a background session in accordance with a control database. The system includes a computer network communication device having a non-volatile memory containing a unique device identifier and a communication module for communicating with a control site, the communication module being configured to generate monitor messages containing the unique device identifier and data corresponding to entry of a command by a user and to parse command messages received from the control site, and a control site comprising a device database and a control database, the control site being configured to compare data in the monitor message to control data stored in the control database in response to the monitor message having a unique device identifier that is also stored in the device database.

A method controls operation of a computer network communication device in accordance with a control database. The method includes generating monitor messages with a unique device identifier and command identification data generated at a mobile communication device, sending the monitor messages to a control site in background to a communication session between the computer network communication device and a communication service, verifying the unique device identifiers in monitor messages received at the control site are also stored in a device database, and comparing the command identification data in a monitor message to control data stored in a control database in response to the unique device identifier in the monitor message also being stored in the device database.

DETAILED DESCRIPTION

Figure 1:
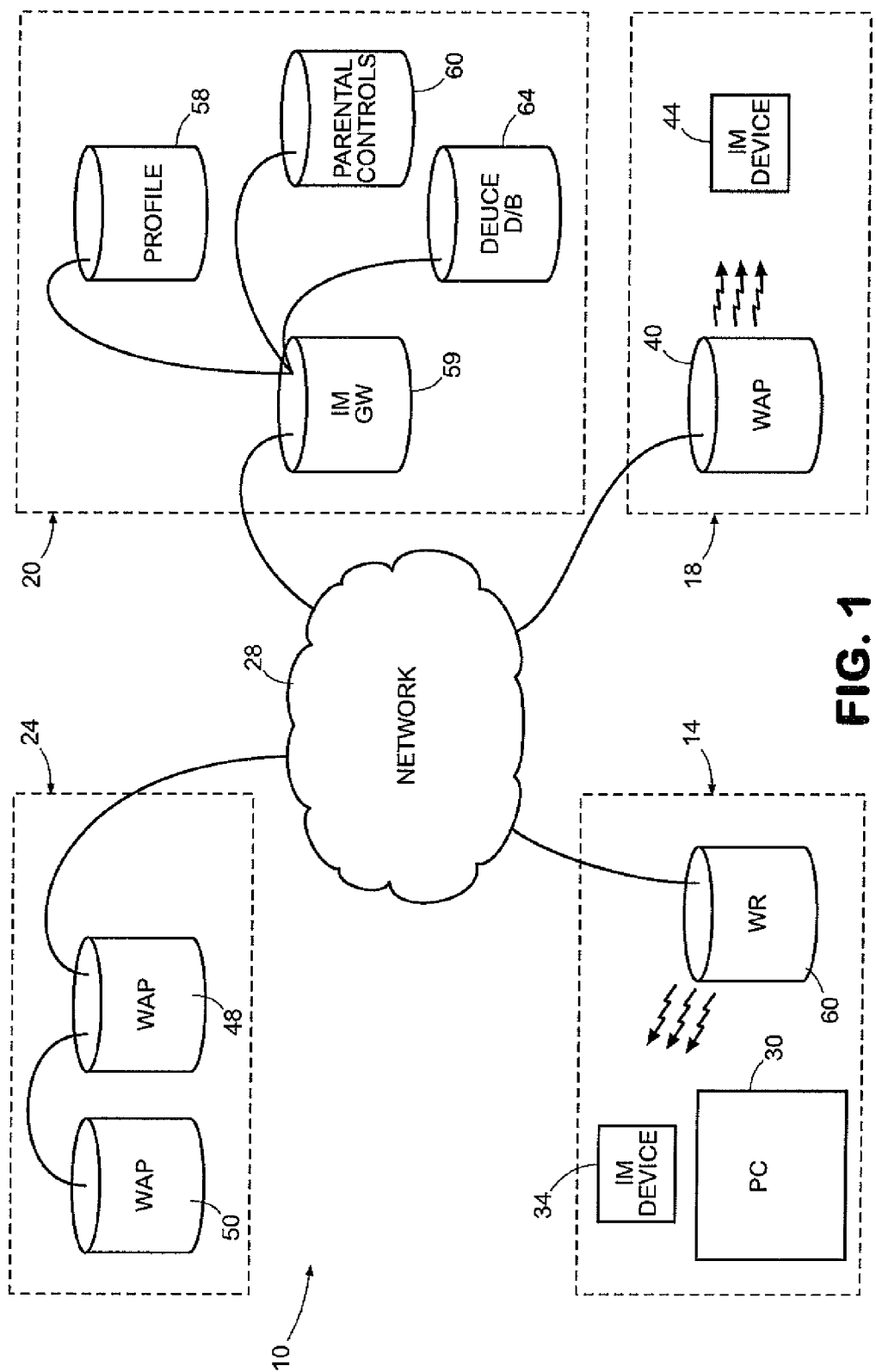
FIG. 1 is a diagram of a system that regulates usage of a mobile computer network communication device that includes a unique device identifier.

A system in which device usage and access may be regulated is shown in FIG. 1. The system 10 includes a home location 14, a remote site location 18, a device regulation/support site 20, and an internet service provider site 24. These sites and locations are coupled to one another through a computer network 28. The computer network may be the Internet, the World Wide Web, WANs, LANs, and/or any other type of computer communication networks. The home location has a local area network (LAN) that includes a personal computer (PC) 30 and a mobile computer communication device, such as an instant messaging terminal 34. These devices communicate with the ISP site 24 or the device regulation/support site 20 through a wireless router 38. The wireless router may wirelessly communicate with the devices at the home site 14 in accordance with one of the IEEE 802.11b, 802.11a, 802.11g, 802.11n, WiMax, or cellular network standards, for example. Using the wireless router 38, the PC may access the ISP site 24 through the network 28 and the mobile device 34 may access the device regulation/support site 20 through the ISP site 24 and the network 28.

The wireless router 38 implements a network access controller that uses smart filters to select the packets that are communicated through the wireless gateway. Typically, the wireless gateway is involved in user authentication for regulating access to the network 28 coupled to the wireless router. The wireless router 38 may include or be coupled to an IP address allocation server. This server is sometimes known as a Dynamic Host Configuration Protocol (DHCP) server. Its function is to assign IP addresses to the devices coupled to the router so they have unique IP addresses for communication. The IP addresses most likely assigned to the devices coupled to the wireless router are private IP addresses. These private IP addresses are typically mapped to a single public IP address by a network address/port translator that is a component of the wireless router 38. The network address/port translator is able to determine the corresponding private IP address for messages received from the network 28 that only have the public IP address. Alternatively, the wireless router 28 may use Media Access Controller (MAC) addresses of the devices coupled to it for identifying the devices coupled to the wireless router.

The remote site 18 includes a wireless access point 40 through which another mobile device 44 may access the ISP site 24 and the device regulation/support site 20. The wireless access point 40 may include additional software and hardware to monitor usage occurring on the remote site premises. The remote site may be a commercial establishment, such as a restaurant or coffee shop, an airport, or other type of location where hotspots are provided. Another type of mobile device that may access the ISP site 24 is a cellular telephone (not shown). The cellular telephone is capable of generating textual messages and receiving textual messages through a SMS texting server (not shown). Control data for the cellular telephone may be stored in the device regulation/support site 20. Additionally, the site 20 may monitor and control use of the telephone and texting functions of the telephone as described below.

The ISP site 24 includes an ISP host server 48. The ISP host server is a gateway to the ISP services and typically requires a computer user attempting to access the ISP services to identify itself with a username and password. Once the ISP host server confirms a user account exists with the ISP, the services supported by the ISP may be accessed. These services are supported by numerous other servers that provide the computer communications for web page hosting, email services, search engines, and the like. One ISP service server that may be provided is an instant messaging service server 50. The instant messaging service server 50 also verifies that any person attempting to access the instant messaging service has an instant or text messaging account with the service. This verification typically includes password processing. After the subscriber gains access to the instant messaging service, the instant messaging server notifies the subscriber of any buddies that are currently online. The instant messaging service, thereafter, relays messages between subscribers coupled to the instant messaging server.

The wireless internet service server 50 may be a component of an Internet service provider as shown in FIG. 1 or it may be a service independent of the Internet service provider, such as a SMS server, for example. To support instant messaging, an instant messaging (IM) service includes components for routing messages between subscribers and administrating the accounts for the subscribers. For messages communicated to other instant message subscribers supported by other ISPs, the messages are communicated over the network 28 to the ISP through which the subscriber reaches the IM service. In the system 10 of FIG. 1, the mobile communication device 34 communicates with the IM service server to communicate with other subscribers. The device 34, however, also communicates with the regulation/support site 20 to configure the device and to regulate the use of the device. Other devices that may be configured or regulated by the site 20 include cellular telephones, LCD photo frames, LCD televisions, devices that display or use proprietary or confidential information, such as an e-book reader, and the like.

The device regulation/support site 20 includes a mobile device communication gateway 54 that communicates with a device database 58, a profile server 60, and a regulation database 64. The device regulation/support site 20 is not part of the instant messaging service, texting service, or other device communicating service. Instead, the device regulation/support site 20 provides support services for mobile computer network communication devices that have been registered with the site. In order to provide these services, the regulation site 20 includes identification data for the devices supported by the site. These identification data are supplied to the site by the manufacturers of the mobile computer network communication devices and are stored in the device database 58. These identification data are unique for each device. By allowing registration of only those devices made by particular manufacturers, the operator of the regulation site is assured the devices have the requisite capabilities for the services supported by the site. The profile server 60 enables users to select and customize device configurations that may be stored at the site by the profile server 60. The regulation database 64 stores the controls and rules selected or generated by an administrative user for a device registered with the regulation/support site 20. These are the rules and controls applied to communications made with a particular mobile device registered with the site 20. In one embodiment, application of the rules and controls to device communications, rather than account communications, enables the system 10 to reduce the risk that a child is able to access instant messaging or other communication services through an alternative account that is not regulated by the device rules and controls. As long as the child is using the device registered with the site 20, the rules and controls are applied to communications from the device 34 regardless of the user account or name through which the instant messaging or communication service is being accessed.

In a similar manner, other devices may be controlled and regulated. For example, LCD photo frames may be similarly registered with the control site 20. Upon activation, the frame is registered upon confirmation of the frame's unique identifier in the device database 58. Rules and controls for these types of devices may include identification of the devices that can upload content to the frames. In fact, rules and controls for devices may cooperate with one another to customize usage of sending and receiving devices. For example, a photo sending device, such as a cellular telephone or PC, may use a SMS texting server or photo collecting database, such as Flickr, Photobucket, or myspace.com to receive photos. Access to these services may be regulated by the rules database at the control site 20 so some, but not all of the collection services may be accessed, or that they can only be accessed at predefined times, or the like. Additionally, the LCD photo frames may be controlled by site 20 in accordance with stored rules and controls to receive photos from only certain of the collection services. In this manner, photos sent to the Flickr service may be received by a photo frame at a first location, while photos sent to the Photobucket service may be received by frames at second and third locations.

Figure 2:
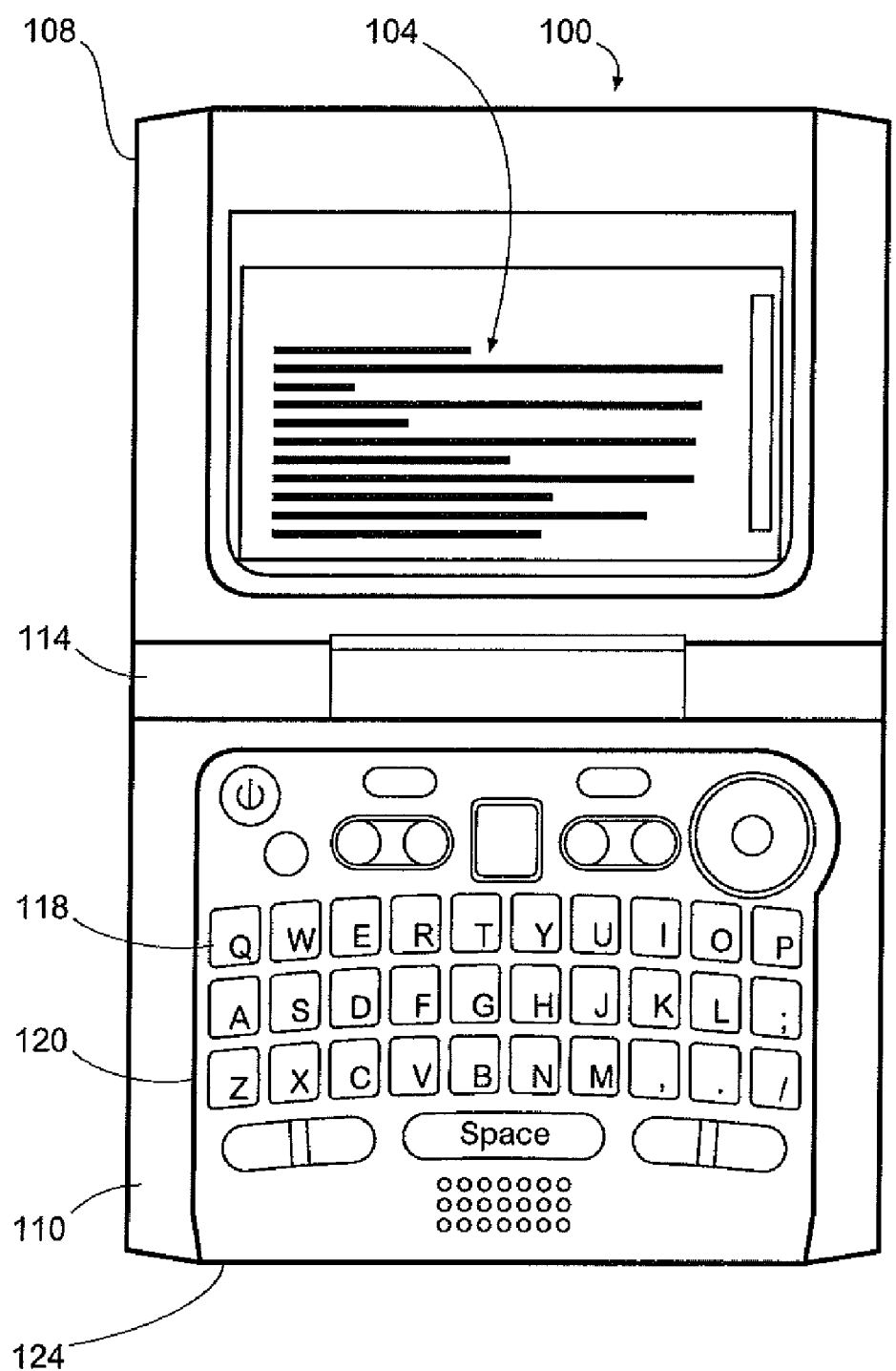
FIG. 2 is a perspective view of an instant messaging terminal that includes a unique terminal identifier for enabling parental regulation of the terminal's use.

An implementation of an instant messaging terminal that communicates with the regulation/support site is shown in FIG. 2. The terminal 100 includes a display 104 on which conversation session windows are displayed. The display 104 is preferably an LCD display incorporated with a lid 108 of a clamshell configuration. Located with the bottom 110 of the clamshell configuration are the components that implement the control module, communications module, and other system elements for the terminal. The lid 108 and bottom 110 of the clamshell configuration are pivotally joined to one another by a hinge 114. Located on the surface of the bottom 110 is a data entry device 118 that is comprised of a QWERTY keyboard section 120, and a pre-programmed emoticon key 124, although non-QWERTY keyboards or input devices that do not use keyboards may be used as well. Although terminal 100 is shown in a clamshell configuration, the terminal may be implemented in other terminal arrangements, such as a handheld terminal that integrates the display and keyboard in an arrangement that does not fold so the display is always exposed.

Figure 3:
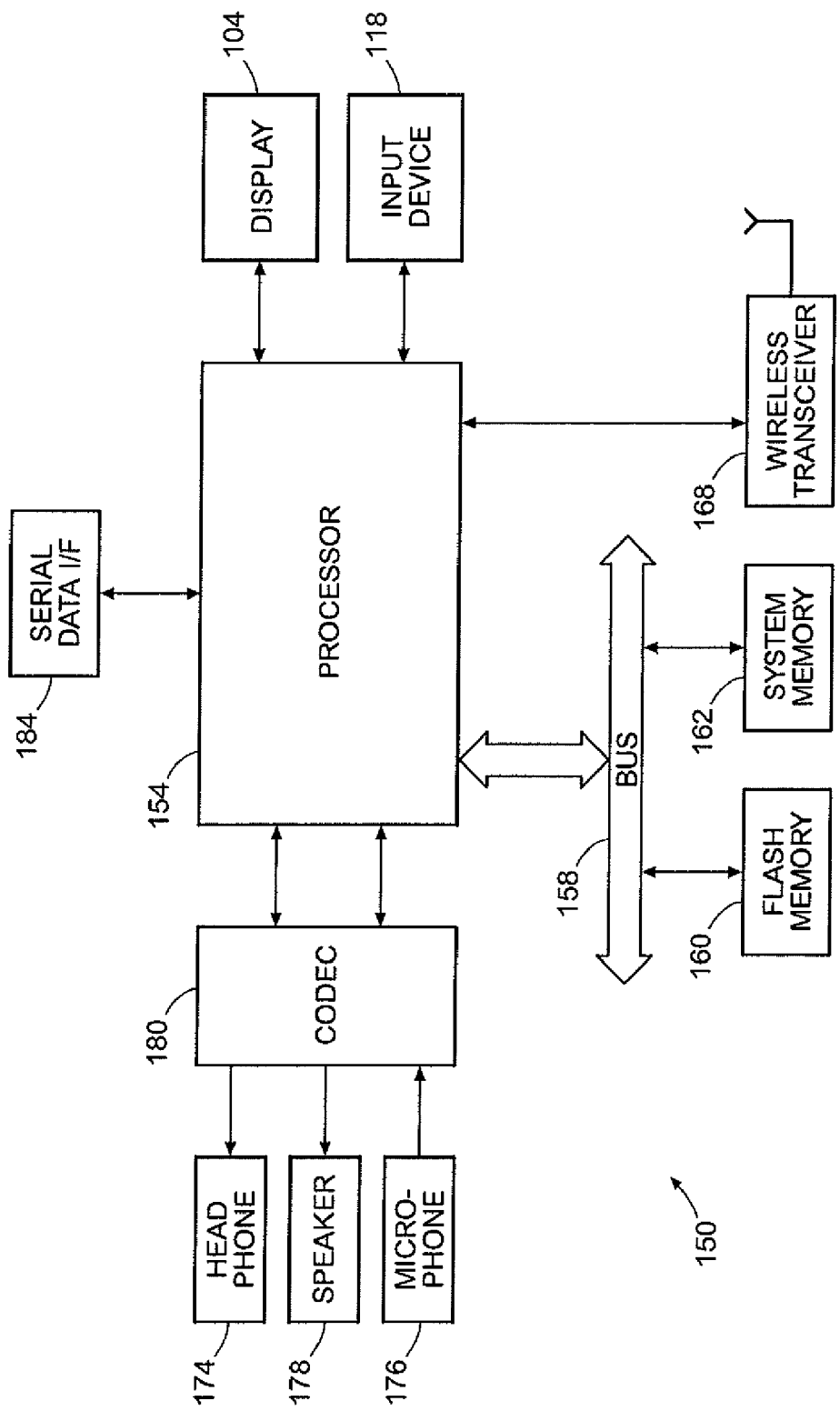
FIG. 3 is a block diagram of the components that may be used to implement the instant messaging terminal shown in FIG. 2.

The components for implementing a communication device 34 are shown in FIG. 3. The system 150 includes a processor 154 that is coupled through a system bus 158 to memory components 160 and 162. A wireless transceiver 168 is also coupled to the processor 154 for bi-directional wireless communication with a wireless router or other wireless access point device. The processor 154 may be a controller, such as an Intel PXA270 operating at 312 MHz with an internal memory for the storage of an operating system and the application program that implement the display, instant messaging and session protocols. However, other processors, ASICs, operating systems, and the like may be used to implement the terminal. The memory component 162 is a system memory used for managing the operation of the terminal and the memory component 160 may be used to update parameters and user settings for the operation of the terminal. Memory 160 or 162 may be used to store a unique identifier that is installed by the manufacturer of the device 34. The unique identifier is also stored in the device database of the regulation/support site 20. The memories 160 and 162 are non-volatile so the unique identifier remains the same during the life of the device. The unique identifier enables the regulation of the device to be implemented without recourse to a user or account identification.

In further detail, the wireless transceiver 168 preferably implements one of the IEEE 802.11 standards, such as 802.11a, 802.11b, 802.11g, 802.11n, WiMax, or other known wireless communication standard, although components supporting other short range communication standards for hot spots or other LANs may be used. The wireless transceiver 168 may radiate a signal through a cabled antenna that may be coupled to the housing of the terminal or through an antenna etched or otherwise provided on a printed circuit card.

Also coupled to the processor 154 are the display 104 and the data entry device 118. The display 104 is preferably a 320×240 color display, although other display types may be used as well. Clock circuitry (not shown) that is preferably capable of providing a 32.768 KHz and 13 MHz signal is coupled to the processor 154. A headphone jack 174, a speaker 178, and a microphone 176 are coupled to the processor 154 through a codec 180 so analog signals from the microphone may be converted to digital signals for processing by the system and so digital signals generated by the system may be converted to analog signals to drive the speaker and headphone to produce audible sound for a user. A serial data interface 184 is also provided for coupling the system 150 to other types of data communication systems.

Figure 4:
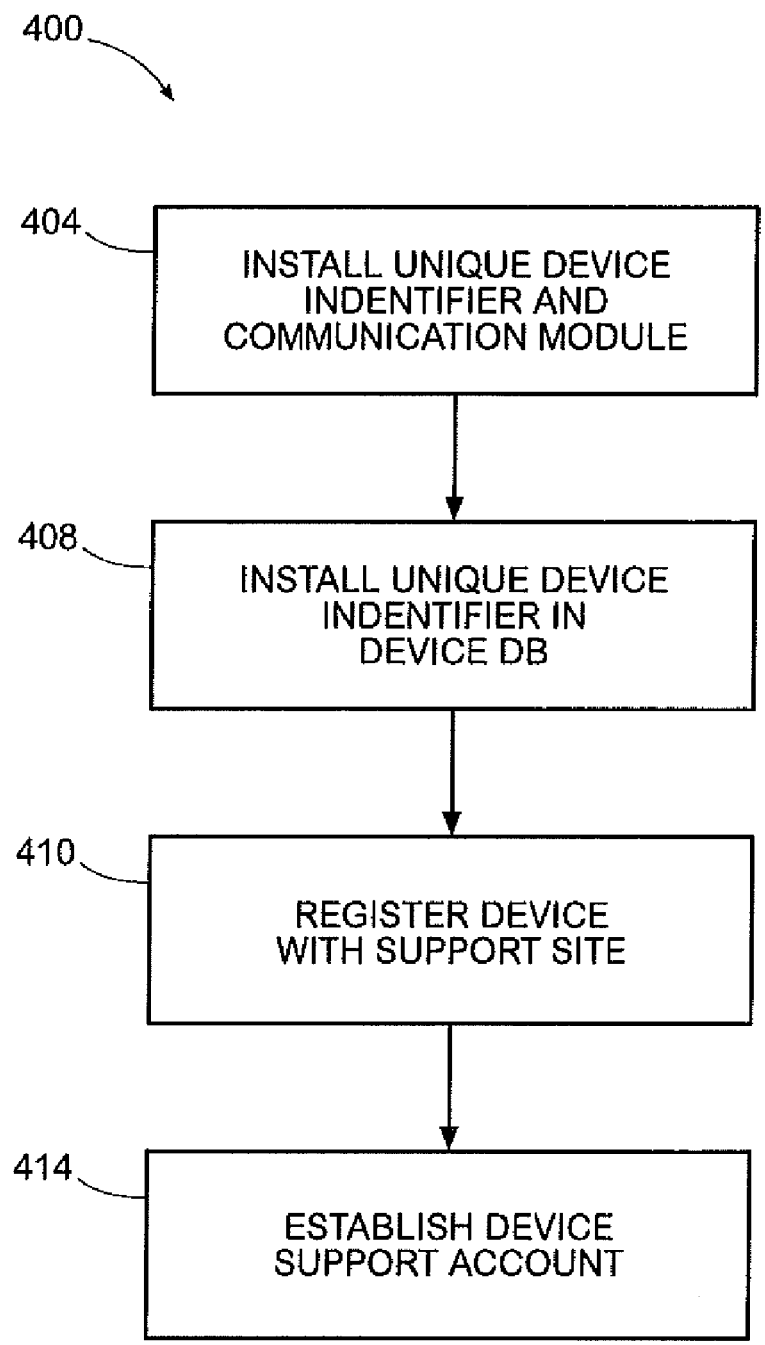
FIG. 4 is a flow diagram of an example of a process for regulating use of a computer network communication device with reference to the unique device identifier.

A process 400 that enables regulation and support for the mobile communication devices 34 is shown in FIG. 4. The process begins with the manufacturer installing a unique identifier and a support communication module in a communication device at the manufacturing facility (block 404). The manufacturer also installs the unique identifier in the device database 58 (block 408). The unique identifier may be numeric or alphanumeric. It may be a value output by a hashing function or other process for generating unique identifiers for the communication devices. The unique identifier is stored in non-volatile memory so it remains constant with the communication device 34. The communication module is configured to communicate with the regulation/support site 20 in response to the communication module being coupled with the network 28. The communication module may be processor instructions to be executed by the processor 154. These instructions are stored in the system memory and are executed in response to a communication session over the network 28 being initiated. Alternatively, the communication module may be implemented with an ASIC or a combination of hardware and software components with the dedicated function of communicating with the regulation/support site 20. The communication module is configured to deliver the unique identifier to the regulation/support site 20 for verification that the device is enabled for support functions provided by the site 20 and to execute commands received from the control site that implement the rules and controls that regulate use of the device 34 on the network 28.

After the unique identifier is installed in the device and the device database, the device is registered with the support site 20 (block 410). Registration is described in more detail below. In the registration process, an administrative user for the device is identified with an administrator name and password. The administrative user may then modify the default rules and controls for the device 34. These rules and controls are stored in the parental control database 64 in association with the unique identifier. While the control database 64 is shown as a single server, it may be comprised of multiple databases and servers for supporting the regulation function. After the administrator has registered the device, the user of the device may establish a user account with a user name and password (block 414). Through this account, the user of the device selects a configuration for the device subject to the controls in the control database 64. Because the device 34 is a device with a keyboard and mouse control that is smaller than a typical PC, the administrative user and the user may use a PC to initialize or modify controls or configurations for the device. Operations with a PC may occur, however, only after the device has been used for the initial registration so the site can obtain the unique identifier and verify the device is capable of being supported by the site 20. Modifications to a device configuration made with a PC are pushed down to the device in response to the device coupling to the network 28 and the communication module commencing communication with the site 20.

Once the device has been registered with the site 20 and the controls and configuration for the device initialized, the device may be used for communication sessions with others over the network 28 using a communication service, such as the instant messaging service 50. This communication occurs in a known manner with the user accessing the service 50 through an ISP, logging into the messaging service, and then operating the device to text message with other subscribers. In response to the device coupling to the network 28 for this purpose, the communication module, executing in the background, initiates communication with the support site 20 for application of the controls to the communication occurring through the device 20.

Figure 5:
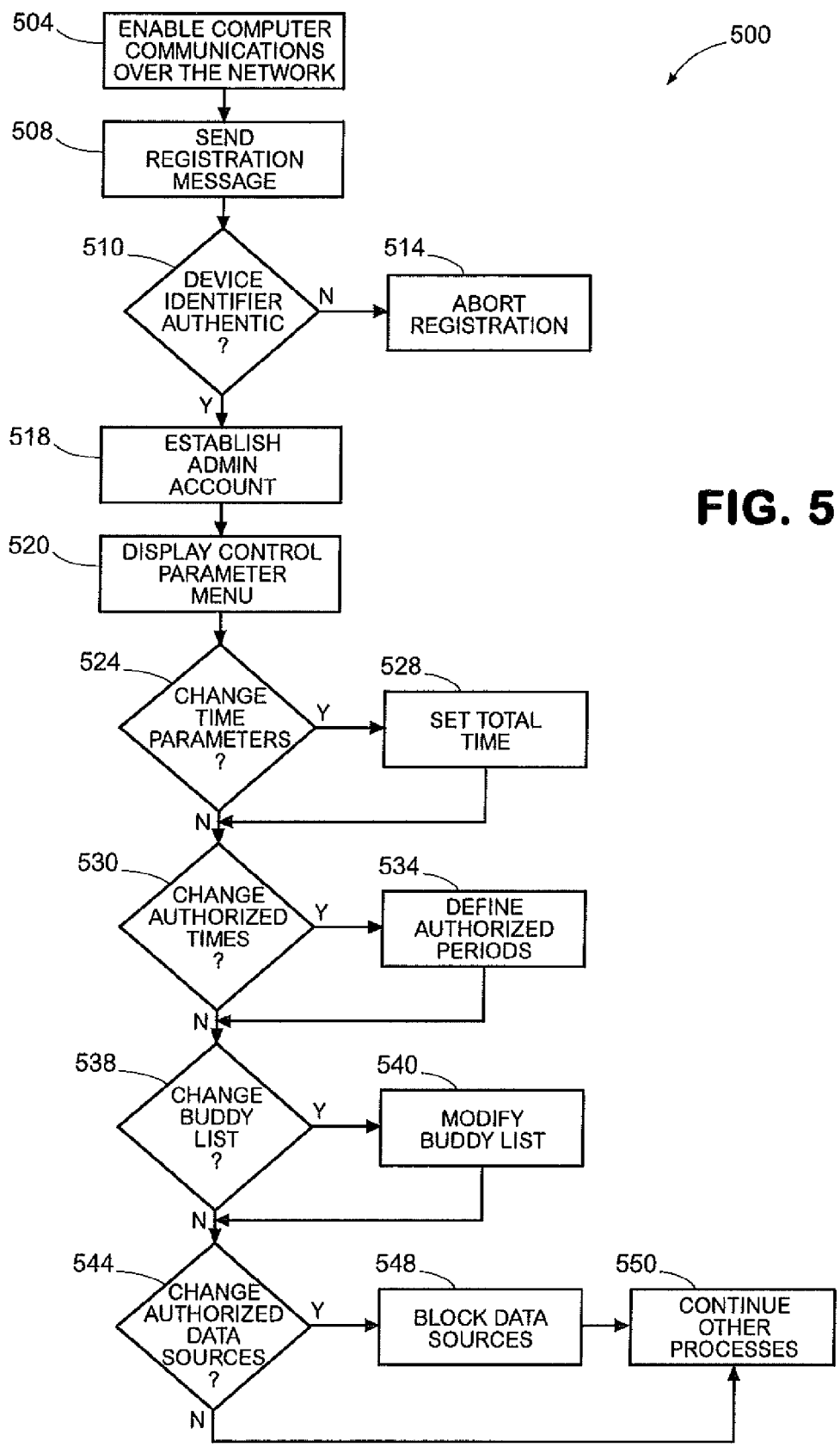
FIG. 5 is a flow diagram of an administrative process for setting controls to regulate use of a mobile communication device.

The registration process and initial administrative device setup 500 is shown in FIG. 5. After purchase, a device 34 is brought to a location where the device establishes a wireless link to a wireless router, such as router 38. This initiation of the device is preferably performed by a user that acts as an administrator for the device. The device logs in with a user's account for ISP access to enable computer network communication through the ISP (block 504). The communication module, in response to detection of communication on the network 28, begins executing in the background and sends a registration message to the regulation/support site gateway 54 (block 508). The registration message includes the unique identifier. The gateway 54 accesses the device database 58 to verify the unique identifier sent by the device is in the database 58 (block 510). If it is not, the registration process is aborted and the user is informed that the device is not authorized for support services (block 514). Otherwise, registration continues.

The registration process includes establishment of an administrative account (block 518). Establishment includes entry of an administrator name and password to control access to the administrative function. A menu of control parameters is presented to the user so the user may view default control parameters for the device (block 520). The administrator may then select control parameters and modify them, if desired. Examples of control parameters are shown in FIG. 5, although the reader should appreciate that other control parameters may be implemented. For example, the administrator may select a total usage parameter for change (block 524). This parameter limits the total time that the device may be used during a predefined period. For example, the default parameter may equal one week of time during a one week period. That is, unlimited usage may be the default option. The administrator, however, may set the usage to another value, such as a particular number of hours or minutes during a day (block 528). Once the value is modified, another parameter may be selected and modified.

Another parameter that may be used to regulate device usage is authorized time of day usage (block 530). This parameter is used to preclude communication with the device during defined periods. For example, the default parameter may enable communication throughout the twenty-four hours of a day. The administrator may, however, choose to deny use of the device during school hours or late evening usage (block 534). Attempts to use the device during these periods result in a denial of service to the device user. The process may be configured to enable an administrator to select different periods for different days of the week so the usage may be authorized for daytime use on weekends and holidays, but not during school days.

As the device is used for communication with others, such as text messaging through an instant messaging service, recipient names are collected. In the instant messaging domain, the device user builds a buddy list. During communication sessions with the messaging service, the communication module of the device also provides the buddy list to the support site 20. These data are stored in the parental control database in association with the unique device identifier. During an administrator session, the administrator may view the buddy list (block 538) and restrict access to or even delete names from the buddy list (block 540). One issue that arises from communications with others over the network 28 is the use of pseudonyms for persons. Thus, names in the buddy list may not be recognizable to the administrator. One function that the administrator may enable while viewing a buddy list is to restrict access to a name in the buddy list until the user identifies by actual name a buddy in the list. Once the user identifies the buddy, the administrator may initiate an administrative session, view the true identity of the buddy, and determine whether to modify the restriction on the buddy. Also, the administrator may restrict communication with a buddy to particular times of day or limit the total communication time with a buddy during a specified period.

The device 34 may include the capability to play streaming music from an internet radio station or other source. Similarly, the device may play video and audio data that streams from a source coupled to the network 28. These sources are also reported to the support site by the communication module in the device 34 and stored in the control database 64. During an administrative session, the administrator may review the sources that have been accessed for streaming data or other downloads, such as RSS feeds or podcasts (block 544). If the administrator considers any of the sources objectionable for the user, the administrator may activate a block rule for these sources (block 548). Once the administrator has adjusted the control parameters to the settings desired by the administrator, the administrative session is concluded (block 550).

Figure 6:
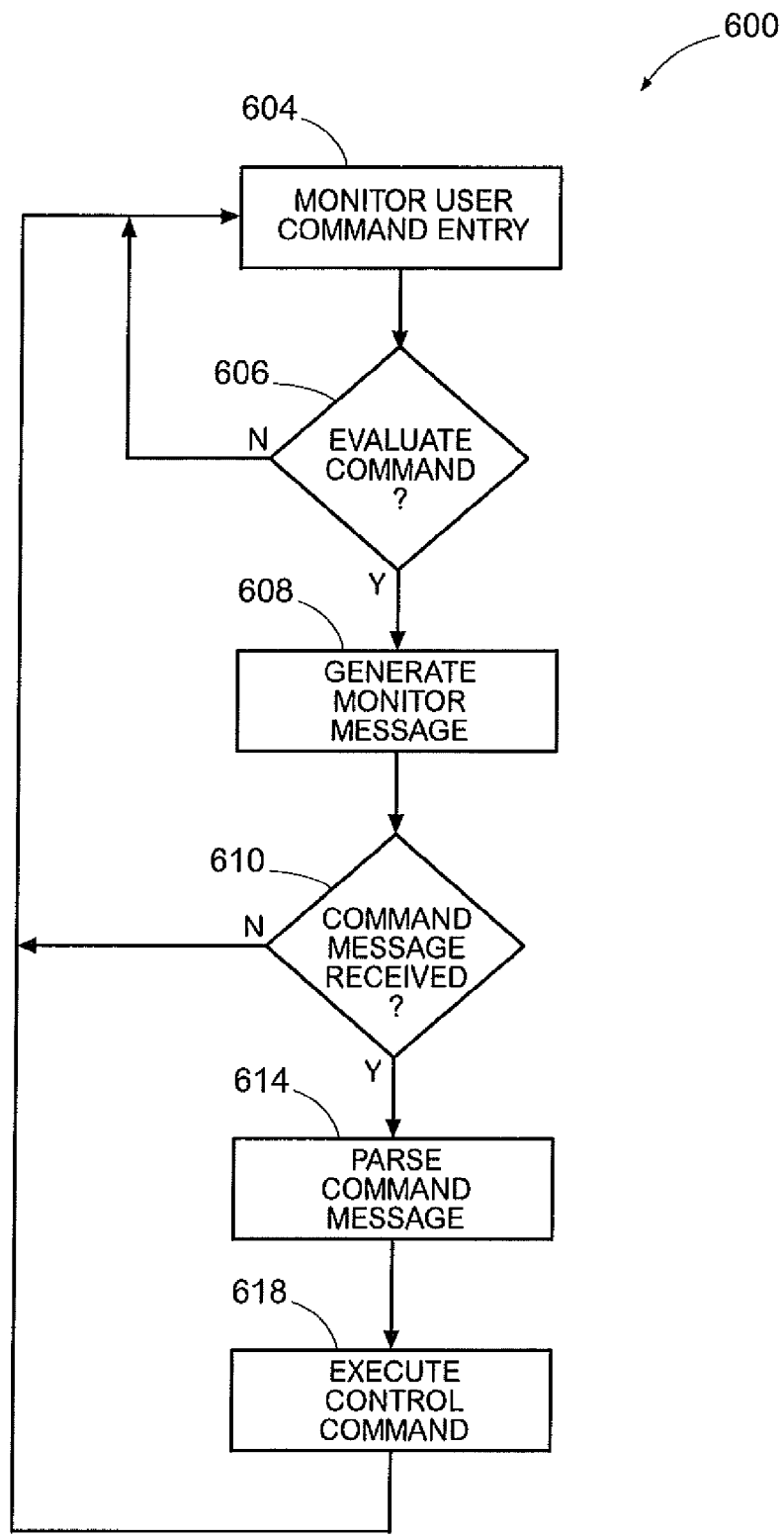
FIG. 6 is a flow diagram of a process for monitoring a mobile communication device operation and responding to commands from a control site for operating the device.

A process performed by the communication module in the device 34 is shown in FIG. 6. The process 600 includes monitoring of the user's command input to the device (block 604). The process determines whether the entered command requires evaluation by the control site 20 (block 606). Commands initiating communication sessions with a buddy, modifying a buddy list, or selecting a streaming or download source, for example, cause the communication module to generate a monitor message (block 608). The monitor message includes the unique device identifier and the data from the command required for control processing at the control site 20. For example, a buddy list entry causes the communication module to send a monitor message that includes the change data or the new entry. Adding a buddy to the buddy list causes the communication module to send the actual identity for which the device 34 queries the user as well as the pseudonym placed in the buddy list. In another example, the communication module may generate a monitor message that includes a streaming or download source identifier. The communication module then checks to see if a command message has been received (block 610). If a command message from the control site 20 has been received, the command message is parsed by the communication module (block 614) and, if verified, performed by the device (block 618). For example, a monitor message regarding initiation of a communication session includes the time of day. The control site 20 may determine the user is attempting device use during a prohibited period or after a time limit has been reached. The command message from the control site 20 that is parsed by the communication module causes the device to terminate the communication session and notify the user of the termination along with a reason for the termination. After the command message has been parsed and executed or no command message has been received, the communication module continues to monitor user input to determine whether additional monitor messages are required (block 604).

Figure 7:
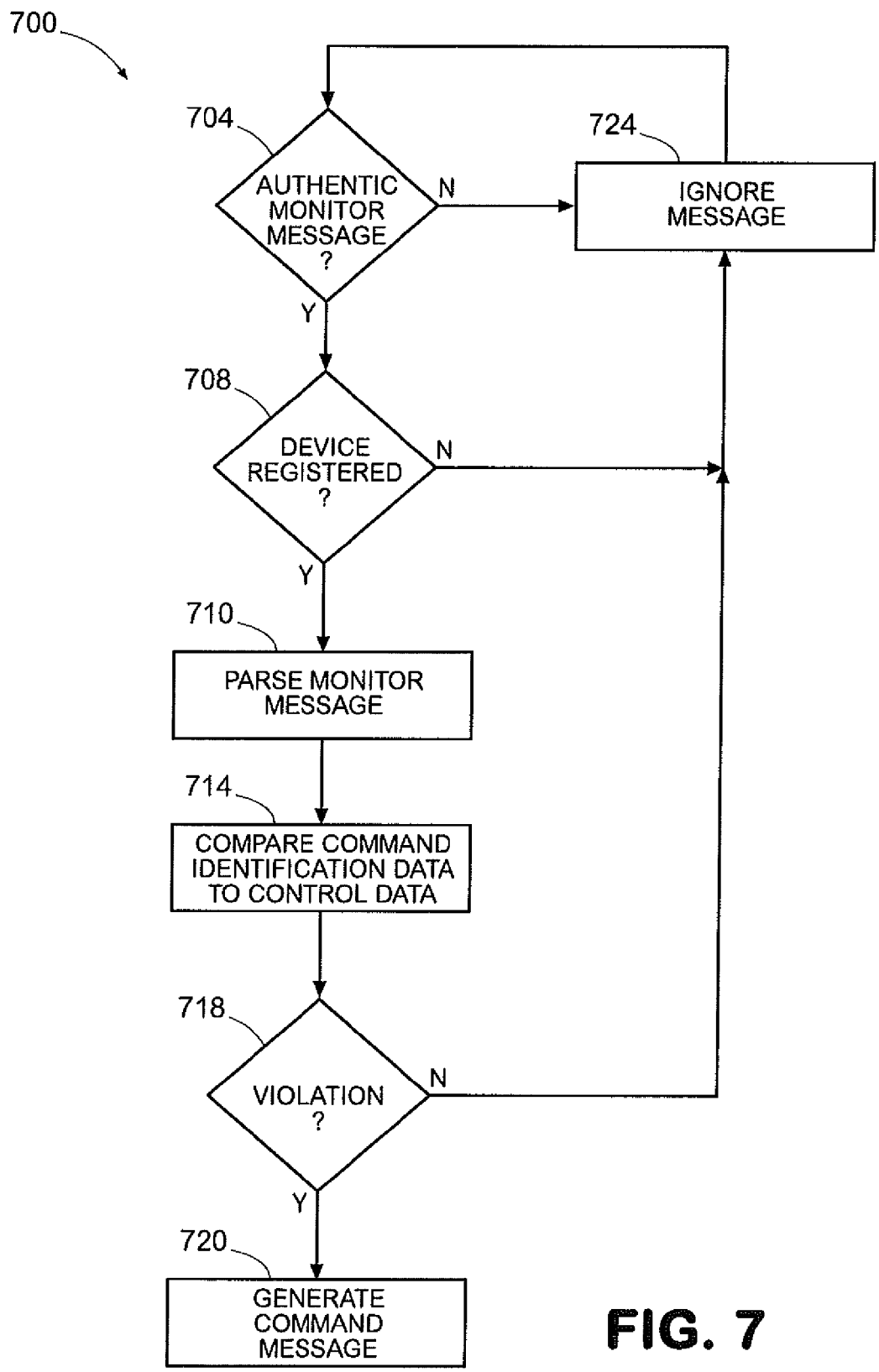
FIG. 7 is a flow diagram of a process for responding to monitoring messages from a mobile communication device and for generating command messages to operate the device.

A process 700 for controlling a device 34 from the control site 20 is shown in FIG. 7. The site 20 receives a monitor message and determines whether it is from a device having a unique identifier in the device database 58 (block 704) and whether the device has been registered (block 708). Alternatively, the process could determine whether an active communication session with the device is open and then check the unique identifier and registration status if no communication session is active. Communications with devices and the control site 20 are preferably performed with the Secure Socket (SSL) communication protocol. If the monitor message is not authenticated, it is ignored (block 724). The monitor message is then parsed (block 710) and the data compared to rules and control parameters stored in association with the device identifier (block 714). If the data violates a rule or control parameter (block 718), a command message is generated (block 720) and sent to the device for execution. The process ignores the message (block 724) then continues to look for monitor messages (block 704).

Subsequent to the registration process or other administrative session, the user may couple to the network 28 through the ISP and initiate communication with the support site 20. This communication is performed in the foreground so the user can view menus and make selections. The menus include configuration menus that enable a user to select theme skins, backgrounds, alert tones, and the like. If these menus are accessed with a PC or other computer and the device configuration altered, the support site stores the configuration data in the user profile database 60 in association with the unique device identifier. In response to the communication module sending a monitor message to the support site at the beginning of a communication session on the network 28, the support site retrieves the new configuration along with any modified control parameters and buddy lists associated with the unique device identifier and pushes these data down to the device. The device installs the configuration and modifies stored control parameters and buddy list changes in the device.

During communication sessions on the network 28 using an appropriate communication service, the communication module of the device 34 sends monitor messages to the support site 20. These monitor messages include the unique identifier so the support site is enabled to store historical data regarding usage of the device in the control database 64. Additionally, the support site compares the data to the rules and controls in the control database 64. Any violations of the rules results in the support site sending command messages to the device 34 for implementation of the rules and controls. For example, the monitor messages provide data regarding operational time for the device, length of communication sessions with particular buddies, and sources of data downloaded to the device. Should the user attempt to extend use of the device beyond the time limits specified for the device or for communications with particular users, the support site 20 issues a shut down command to the device 34. The device 34 responds to the shut down command by terminating a communication session with the communication service and informing the user of the reason for the shut down. Optionally, the device 34 may notify the user of an impending shutdown and give the user a short time period for terminating the communication voluntarily. If the user does not terminate the communication session by the end of the short period, the device 34 terminates the communication session upon expiration of a timer corresponding to the short time period.

A user may attempt to add a buddy to the list that has been deleted by the administrator. As the user adds new buddies or deleted buddies to the buddy list stored in the device, the communication module sends a monitor message to the support site 20 that identifies the buddies being added to the list. The monitor message includes the buddy pseudonym and the actual identity entered by the user in response to the prompt generated by the device. The buddy data are compared to the rules and controls in the control database 64. If any buddy has been previously deleted or if any new buddy has not been identified with an actual identity, the buddy is associated with a block rule. Any subsequent monitor messages that indicate the user is attempting to send a message to the buddy associated with a block rule results in the support site 20 sending a block message command to the device 34. In response, the device 34 displays a message to the user that communication with the buddy has been blocked and that the administrator must be consulted for permission to communicate with the buddy.

In a similar manner, messages to sources for streaming data or data downloads result in the communication module sending a monitor message to the support site 20. The support site 20 compares the sources identified in the monitor messages to sources associated with block rules stored for the device unique identifier. If a source corresponds to a blocked source, the support site 20 sends a block message to the device 34. The device 34 interrupts the data download and displays a message informing the user that the download has been terminated. The message also informs the user that access to the source cannot be obtained without the action of the administrator.

The system and method described above more reliably control operation of mobile devices. The unique device identifier ensures that the user is not able to establish an alternative account or use another subscriber's account that does not have controls or rules regulating its use. Even if the user logs into a communication service with another account, the communication module sends monitor messages to the support site, which applies controls and rules to the communication session being conducted with the device. Also, applying rules and controls stored at the support site in association with the unique device identifier preserves the rules and controls from modification by the user. Likewise, storage of the buddy list at the support site in accordance with the administrator's instructions provides a more reliable restriction on the persons with whom a user may communicate using the device 34.

The system structure and database content described above may be used for control of other devices. For example, original equipment manufacturers (OEM) may operate a control site that includes unique identifiers for products made by the OEM operating the control site. After users have purchased a device and initiated contact with the site, custom features and authorizations may be obtained through the OEM control site. Service options may also be presented to the user. Use of the device is monitored through the monitor messages so the user is unable to receive services other than those enabled through the OEM control site. For example, rules and controls may be stored for controlling operation of a device that control and/or distribute content to devices. After the device has been registered, the OEM operator of the site allows a user of the device to select to have content delivered to the device either on a pay-per-delivery or subscription basis. Such content, may be, for example, e-books or periodicals. Of course, if administrator accounts are implemented for the devices, any selections made by a user are also subject to the rules set up by the administrator. In a similar manner, an OEM operator could store rules that regulate the services that may be accessed by a registered user. For example, the OEM may require use of a proprietary photo-sharing site, rather than the public sites, such as Flickr. In a similar manner, the OEM may store rules that make content from a first content source available to a first group of users and content from a second content source available to a different group of users. The groups may be distinguished on the basis of product features or service levels purchased with the devices.

The structure of the rules and controls of site 20 as described above also enables devices to be controlled with reference to locations. For example, some WiFi hot spot operators choose not to support some features, such as SMS texting, for example. These operators can contract with an OEM operator of a site 20 to include rules in the database that disable use of a service upon detection of being in hot spot operated by a business not supporting the service. Upon the site 20 detecting a monitor message that indicates the device is operating in a hot sport operating by such a business, the site 20 sends a control message to the device to disable use of the unsupported service while the device is using that hot spot. Alternatively or additionally, the business operating the hot spot may also contract with the OEM to store rules that push particular content to the device when it is detected as being in a hot spot operated by the business. Furthermore, the business may make available different content for geographical regions. Thus, the site 20 may push different types of content to devices operating in different hot spots operated by the same national chain in response to monitor messages not only indicating the device is operating in a hot spot operated by the chain, but the geographical location of the device as well.

Another application of the structure described above is device control at a particular property, such as a hotel. The hotel operator, for example, may have unique identifiers in a control site database for all of the televisions operated at the hotel. Upon check-in, a guest may identify the services, such as Internet access, games, or movie selections, that the guest wishes to select through the room television. Use of the television during the guest's stay is regulated by the control site parsing the monitor messages and comparing the user activities with the television against the check-in selections. Upon checkout, the controls may be reset to a default set of access values. Other applications are, of course, possible and envisioned.

While the system and method for device control have been illustrated by the description of exemplary processes and system components, and while the various processes and components have been described in considerable detail, applicant does not intend to restrict or in any limit the scope of the appended claims to such detail. Additional advantages and modifications will also readily appear to those skilled in the art. The system and method described above in its broadest aspects are therefore not limited to the specific details, implementations, or illustrative examples shown and described. Accordingly, departures may be made from such details without departing from the spirit or scope of applicant's disclosed system and method.

What is claimed is:

1. A system for controlling computer network communication devices that communicate over a computer network comprising:
a computer network communication device having a nonvolatile memory containing a unique device identifier;
a controller operatively connected to a memory in which programmed instructions are stored within the computer network communication device, the controller being configured to execute the programmed instructions to implement a communication module that generates a data message for use with a service provided by an Internet Service Provider in response to a command entered by a user, to generate a monitor message containing the unique device identifier and data corresponding to the command entered by the user, and to parse command messages received by the computer network communication device; and
a control site comprising a server operatively connected to a device database and a control database, the server being configured to compare data in the monitor message received from the communication module in the computer network communications device to control data stored in the control database in response to the monitor message received from the communication module in the computer network communications device having the unique device identifier that is also stored in the device database and to establish an administrative account for a device in response to the unique device identifier corresponding to a device identifier stored in the device database.

2. The system of claim 1 wherein the computer network communication device is an instant messaging device.

3. The system of claim 2 wherein the communication module of the instant messaging device is further configured to detect buddy list selections, buddy list additions, and buddy list modifications and to generate monitor messages containing buddy list data.

4. The system of claim 2 wherein the control database is further configured to store time usage limits, time of day limits, and buddy restrictions in association with a unique device identifier.

5. The system of claim 2, wherein the server is further configured to compare data from monitor messages received from the communication module of the instant messaging device to the control data stored in the control database in association with the unique device identifier stored in the device database.

6. The system of claim 2 wherein the communication module is further configured to communicate with the server in background of a communication session between the instant messaging device 7. The system of claim 1 wherein the server is further configured to generate control data and store control data in the control database in response to messages received by the server that correspond to the administrative account. and an instant messaging service.

8. The system of claim 7 wherein the administrative account is a parental control account for an instant messaging terminal.

* * * * *